United States Patent [19]
Whitsitt

[11] Patent Number: 5,528,037
[45] Date of Patent: Jun. 18, 1996

[54] BAND ANALYSIS SYSTEM

[75] Inventor: Stephen J. Whitsitt, Manhattan Beach, Calif.

[73] Assignee: TRW Inc., Redondo Beach, Calif.

[21] Appl. No.: 486,440

[22] Filed: Jun. 8, 1995

[51] Int. Cl.$^6$ ........................................... G01J 3/02
[52] U.S. Cl. ............... 250/339.14; 250/342; 250/339.01; 244/3.16
[58] Field of Search ............................... 250/342, 339.01, 250/339.02, 339.13, 339.14, 332; 244/316

[56] References Cited

U.S. PATENT DOCUMENTS

| | | | |
|---|---|---|---|
| 4,465,940 | 8/1984 | Graff et al. | 250/339.14 |
| 5,300,780 | 4/1994 | Denney et al. | 250/342 |
| 5,479,255 | 12/1995 | Denny et al. | 250/342 |

*Primary Examiner*—Carolyn E. Fields

[57] ABSTRACT

A band analysis system for determining the optimal signal-to-noise ratio between the spectral emissions from an object of interest and the spectral emissions from background noise for a target detecting and tracking system. Known target and background spectra are applied to a band select system in order to select an initial choice of bands. These bands are then applied to a sensor model system which determines a template for each spectrum. The templates are applied to a noise generation system in order to generate a noise function indicative of the vibrational noise of the sensor and the electronic noise of the system. The noise function also includes a function of the integration time over each band. The noise function and the templates are then used to determine a signal-to-noise ratio based on a weighting function. The signal-to-noise ratio is applied to the band select system and the integration time select system in order to adjust the bands and their integrations time to the optimum value.

24 Claims, 1 Drawing Sheet

BAND ANALYSIS SYSTEM

BACKGROUND OF THE INVENTION

1. Field of the Invention

This invention relates generally to a spectral band analysis system and, more particularly, to a spectral band analysis system for determining appropriate frequency bands and associated integration times that will increase the signal-to-noise ratio between the spectral signature of an object or objects of interest and the spectral signature of background noise and clutter so as to effectively identify the objects within the background.

2. Discussion of the Related Art

Strategic and tactical detection and tracking systems which detect and track objects or targets of interest that are moving relative to the earth's surface are known in the art. These detection and tracking systems include ground based and air based systems that detect and track strategic objects such as aircraft, missiles, motor vehicles and the like. Although many different types of detection and tracking systems are known, the basic goal of each system is to provide a very high probability of detecting the target of interest when the target is present, while at the same time preventing the system from indicating a target detection when no target is present. In other words, these systems must have a high signal-to-noise ratio (SNR) between the target signals and background or noise signals in order to effectively separate the target from any background clutter or noise.

One system of the type discussed above that performs missile launch detection and tracking from a satellite orbiting the earth is disclosed in U.S. Pat. No. 5,300,780, issued Apr. 5, 1994, titled MISSILE SURVEILLANCE METHOD AND APPARATUS, assigned to the assignee of the instant application, and herein incorporated by reference. This detection and tracking system incorporates an infrared sensor which detects infrared radiation being emitted from the Earth's surface. The sensor includes a series of detectors where each detector absorbs energy from a particular area or scene of the Earth's surface. The detectors will absorb energy of differing intensities for each wavelength within the frequency range of the sensor from the emissions of the objects in the scene. The different background clutter objects, such as clouds, and the objects of interest will emit infrared energy intensities at the different wavelengths within the frequency range being sensed. When viewed as an image of a particular area of the earth's surface, each detector intensity and location is referred to as a pixel (picture element).

The radiation received by the sensor is sent through a series of color filters before the radiation impinges the detectors. The color filters separate the frequency range into a series of frequency bands where each band is a continuum of wavelengths. The filters are incorporated on a wheel such that as the wheel turns, each filter will receive the impinging radiation. The rotational speed and operation of the wheel is selected such that each filter receives the radiation for a predetermined time in order to set an integration time for each band. As will be discussed below, the filters and integration times are selected to increase the SNR between the background and the targets of interest.

FIG. 1 shows a graphical representation of the signature spectral pattern of background emissions and the emissions of a particular target of interest across the frequency range of the sensor. The relative energy for each wavelength is given in the vertical axis and the frequency range is given in wavelength increments on the horizontal axis. The relative energy is not the actual energy but is a relational value with respect to all of the energies. The infrared wavelength range is between 2.0 and 5.0 µm and each slash along the wavelength axis is about 50 nm.

In order to more reliably detect and track a target of interest, it is necessary to know how to selectively determine which bands and associated integration times within the frequency range being sensed best separate the target when compared with the background/clutter emissions at those bands. Two factors enable the target emissions to be more effectively separated from background clutter emissions. First, the difference in intensities between the target signal and the background/clutter signal. Second, the shape of the waveform of the target signal when compared to the shape of the background/clutter waveform. By combining these factors, the SNR between the target emissions signal and the background/clutter noise signal can be increased in order to more reliably detect and track the target.

The particular wavelength bands and integration times which are used to distinguish the target signal from the background signal are selected in the prior art by visually inspecting the spectral signatures of the target and background. The top row of black bars labeled "initial bands" beneath the horizontal axis in FIG. 1 shows seven different bands which have been determined to be the more desirable areas where these two factors would best separate the target signal from the background noise signal. Depending on the particular number of targets being monitored, the number of bands will be chosen accordingly. Once the bands are selected, the color filters of the targeting system can then be set. In a multi spectral (MS) system, the number of bands is typically less than ten. In a hyper spectral (HS) system, the number of bands is typically greater than one hundred.

For the particular system discussed above with reference to U.S. Pat. No. 5,300,780, an algorithm (set out below) is used which includes a number of attributes for dealing with false target rejection and background uncertainty when compared with conventional matched filtering. A mix of expert experience, feedback from real systems, and simulations have established band selection and integration time with good results. However, the algorithm has some characteristics related to the need for target-to-background orthogonality which may not be obvious and as such the best band choices to optimize target-to-background or target-to-target separation and band integration time may not be used. Specifically with regard to MS system, the complications of overlapping bands and band-to-band correlation degrades this optimization process. Therefore, the prior art process of selecting bands and associated integration times does not provide the optimal results for such a system.

What is needed is a band analysis mechanism which determines the most appropriate wavelength bands and integration times which would best distinguish the target emissions from the background emissions in order to more reliably detect a target of interest. It is therefore an object of the present invention to provide such a band analysis mechanism.

SUMMARY OF THE INVENTION

In accordance with the teachings of the present invention, a band analysis system is disclosed for determining the optimal SNR between the spectral emissions from an object or objects of interest and the spectral emissions from background noise. The band analysis system determines the best combination of wavelength bands and integration times within a range of sensor frequencies, such as the infrared range, in order to more reliably detect the spectral emissions of the object of interest when compared to the spectral emissions of the background clutter. Once the optimal bands and integration times are determined, this information can be incorporated in a target detecting and tracking system in order to establish a set of color filters for the bands.

A system user first selects which frequency spectrum for background and targets of interest are to be used to determine the optimal SNR. The spectrum are applied to an n-band select system which selects a first choice of bands. These bands are applied to a sensor model system that generates a template for each spectrum depending on the aperture of the lens of the system, the footprint or pattern of the field being sensed, and the distance that the system is from the target and background objects. The templates are applied to a noise generating system which generates a noise function indicative of the line-of-sight clutter noise of the sensor due to drift and vibration, and the electronic noise of the system. An integration time for each band from an integration time select system is also applied to the noise generating system as a user input. A noise covariance value is then generated from the noise function. Along with the noise covariance value, the templates are used to generate an SNR. The value of the SNR is applied to a system for generating a composite SNR depending on a weighted value. An output of the composite SNR system is applied to the n-band select system and the integration time select system in order to adjust the bands and their integration times to an optimal value.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
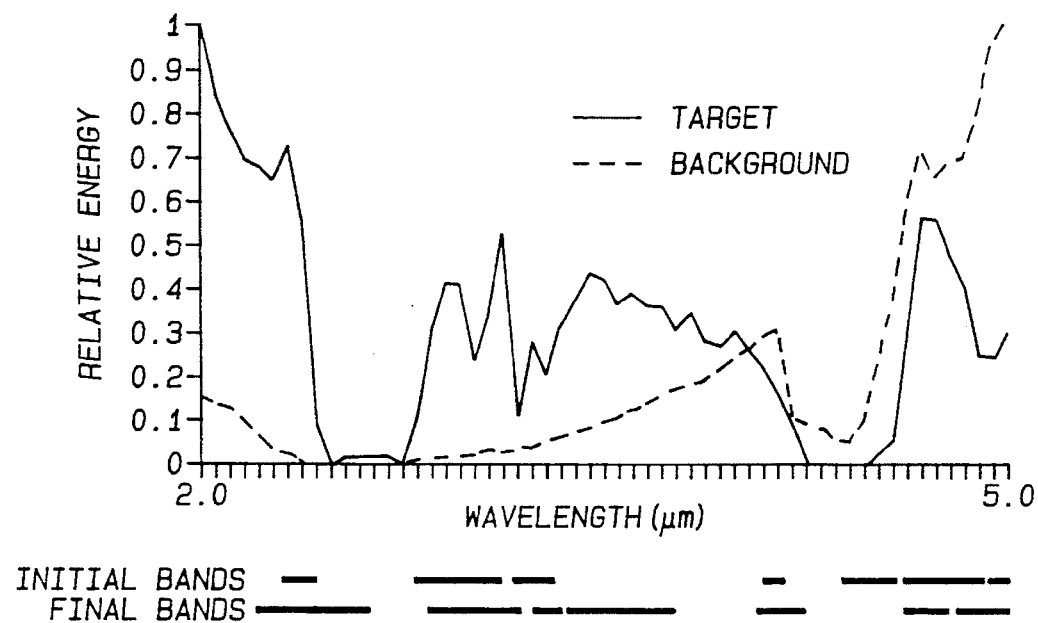
FIG. 1 is a graphical depiction of the signatures of a target of interest and background noise where the horizontal axis represents wavelengths and the vertical axis represents energy intensities.

The following discussion of the preferred embodiments concerning a band analysis system for detecting an object of interest against background clutter is merely exemplary in nature and is in no way intended to limit the invention or its application or uses.

It is known in the art to model the output from each detector of an infrared sensor (not shown) used to detect a target or targets of interest in a target detection and tracking system (not shown) such as disclosed in U.S. Pat. No. 5,300,780 discussed above, as follows:

$$S = \sum_{j=1}^{m} \alpha_j S_j + N \quad (1)$$

where,

S is an n×1 vector $[S_i]$ representing the intensity for each pixel in each of a number of selected n bands, where i is the band number;

$S_j$ is an n×1 vector representing the intensity of a jth template (discussed below), where there are m number of templates;

$\alpha_j$ is the scalar intensity value of the jth template for the target being detected; and N is an n×1 vector representing all of the unknown noise terms for a pixel.

The m templates represent the expected n band energies for all of the emissions detected by the sensor. To make an informal distinction, an operational MS sensor system has each band component $S_i$ either synthesized by summing adjacent narrow HS bands or each band is collected from a single continuous pass band of a wider bandwidth sensor such as one filter of a filter wheel combined with an infrared detector array. In the MS sensor system, n is small (<10) and the bands are usually contiguous. On the other hand, an HS sensor system is the case where n is large (>100), the bandwidth is small, and S is formed primarily from contiguous bands. HS systems can readily solve for the target strengths $\alpha_j$ of many targets simultaneously due to the larger dimensionality of the solution space. Although the following discussion is directed towards band analysis for an MS system, it is noted that the system can be readily modified for an HS system.

For a particular MS sensor system, equation (1) can be reduced to a single background and a single target as follows:

$$S = \alpha_T S_T + \alpha_B S_B + N \quad (2)$$

where the subscript T is for the target and the subscript B is for background. The target detection and tracking system would solve for $\alpha$ in these equations in order to determine if a target is present. A system threshold is set such that if $\alpha_T$ is above a predetermined threshold, then the system determines that this target does indeed exist. In the system of U.S. Pat. No. 5,300,780 discussed above, a generalized least squares estimate (GLSE) is used to calculate for the signal strengths $\alpha_j$ by the following equation:

$$[\hat{\alpha}_i] = [S_i^T K^{-1} S_j]^{-1} [S_i^T] K^{-1} S \quad (3)$$

In equation (3), the noise term N has a covariance matrix K. For the single target and background of equation (2), equation (3) reduces to:

$$\begin{bmatrix} \hat{\alpha}_T \\ \hat{\alpha}_B \end{bmatrix} = \begin{bmatrix} S_T^T K^{-1} S_T & S_T^T K^{-1} S_B \\ S_B^T K^{-1} S_T & S_B^T K^{-1} S_B \end{bmatrix}^{-1} \begin{bmatrix} S_T^T \\ S_B^T \end{bmatrix} K^{-1} S \quad (4)$$

As will become apparent from the discussion below, this equation will be used to calculate the signal-to-noise ratio (SNR) in order to optimize it.

Figure 2:
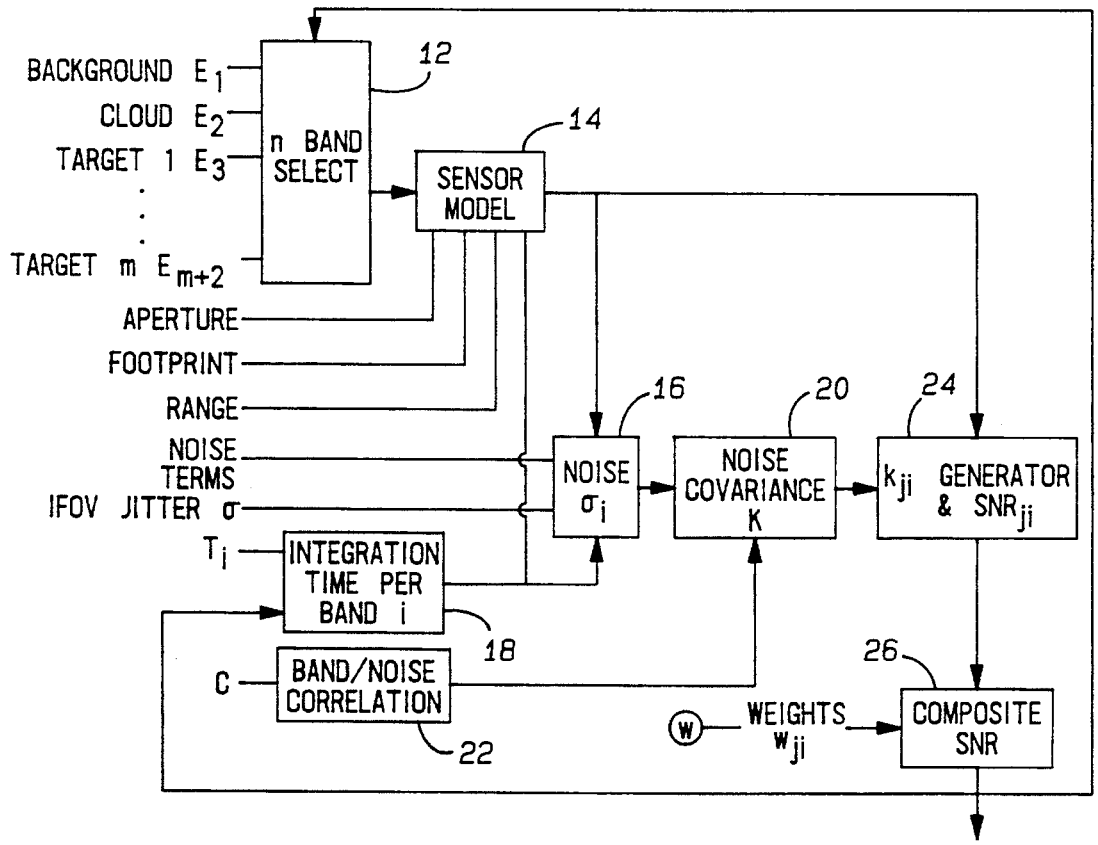
FIG. 2 is a block diagram depicting a band analysis system according to a preferred embodiment of the present invention.

FIG. 2 shows a block diagram of a band analysis system 10, according to a preferred embodiment of the present invention, for determining an optimal SNR between a number of target spectra and background clutter spectra in order to reliably detect and track the associated targets against a scene including the background clutter. The spectra are applied as user inputs to an n-band select system 12. For the system 10, there is a background spectrum, a cloud spectrum and m number of target spectra. Each spectrum represents an emission signature. To get the background spectrum, emissions are sensed from the scene when no targets are present to determine the signature emission of the background. Additionally, a reference spectral emission is determined for each particular target to be monitored. If the user inputs to the n-band select system 12 is the single target and background spectra as shown in FIG. 1, the n-band select system 12 generates the number of bands and the frequency range of each band for the entire sensor spectrum as shown as the initial bands of FIG. 1. A system user would specify whether to incorporate a clutter spectrum modeled as a cloud signature or a single background signature.

The initial bands for each spectrum as generated by the n-band select system 12 are applied to a sensor model system 14 which establishes a template for each spectrum based on the widths of the bands. A template is a collection of energy values for each of the selected bands that defines a particular spectrum. The sensor model system 14 has user inputs which define the aperture of the sensor, the footprint or pattern of the field of view of the sensor, and the distance at which the sensor is from the objects being sensed. Sensor models applicable for the sensor model system 14 would be readily accessible to someone skilled in the art.

Each template includes a series of components $S_{ij}$, where i is the band number in the spectrum and j is the spectrum number. The template components $S_{ij}$ are determined as follows:

$$S_{ij} = \sum_{k=l_i}^{u_i} T_i E_{kj} \quad i = 1:n \tag{5}$$

where, k is a number representing the wavelength;

$T_i$ is integration time for band i;

$E_{kj}$ is the energy of the j spectrum centered at wave number k; and $l_i$, $u_i$ are the lower and upper band edges for the ith band, respectively.

The individual wave numbers k correspond to the center of the bands over which energy is measured or estimated. Therefore, a template is constructed and tested prior to implementation by forming the vector $S_j$ for template j out of the template components $S_{ij}$.

The template components $S_{ij}$ are applied to a noise function system 16 in order to generate a noise function $\sigma_i$ for each template $S_j$. User inputs to the noise system 16 include precalculated noise terms for line-of-sight motion of the sensor, such as jitter, and noise terms for electronic noise. More particularly, a precalculated user input for a filter wheel thermal noise over all of the bands i is determined as $\sigma_f^2$, a detector noise over all of the bands i is determined as $\sigma_d^2$, a readout electronics noise terms which is fixed over all the bands i is determined as $\sigma_{ro}^2$, an analog-to-digital converter noise that is fixed over all the bands i is determined as $\sigma_{adc}^2$, a frequency dependent noise over all of the bands i is determined as $\sigma_{1/f}^2$ and a jitter noise term as a result of sensor vibrations is determined as "jitter". One skilled in the art will readily recognize how to calculate these noise values in any given implementation.

Also, an integration time $T_i$ for each band as calculated by an integration time system 18 is applied to the system 16. The system user will set an input integration time for each band prior to initiation of the system 10. The noise terms will vary for each different integration time.

As the system 10 determines a better combination of band edges and integration times $T_i$, the system 10 varies each of the $T_i$, holding their sum fixed. The system 18 together with the system 12 uses the weighted output of the system 10 indicated in FIG. 2 as an objective function in order to optimize the choice of band edges and integration times, using one of several standard optimization algorithms.

The noise function $\sigma_i$ is determined as follows:

$$\sigma_i = \{T_i(\sigma_f^2 + \sigma_d^2) + S_{i1} + k_2 S_{iM} + \text{jitter}^2(S_{i1} - S_{i2})^2 + \sigma_{ro}^2 + \sigma_{adc}^2 + \sigma_{1/f}^2\}^{1/2} \tag{6}$$

The term $S_{i1}$ accounts for shot noise, $k_2$ and $S_{iM}$ for shot noise due to a very bright target (if applicable), and "jitter" is one $\sigma$ line-of-sight variation.

The noise function $\sigma_i$ is then applied to a noise covariance system 20 in order to generate a noise covariance K that is a reasonably accurate noise source model. A band/noise correlation system 22 generates a correlation signal C, and applies the signal C to the noise covariance system 20. The correlation signal C of the noise covariance is an expression that relates how much of each band energy is due to noise or clutter if a correlated noise or clutter occurs across more than one of the bands. In this example, C is defined as follows:

$$C = \begin{bmatrix} 1 & \cdots & \rho \\ \cdot & \cdot & \cdot \\ \cdot & \cdot & \cdot \\ \cdot & \cdot & \cdot \\ \rho & \cdots & 1 \end{bmatrix} \tag{7}$$

where, $\rho = \rho_{ij} = \rho_{ji}$ are band-to-band correlations.

The noise covariance K is then determined as follows:

$$K = \Sigma C \Sigma = [\rho_{ij}\sigma_i\sigma_j], \text{ a matrix} \tag{8}$$

where, $$\Sigma = \text{diag}[\sigma_1, \ldots, \sigma_n] \tag{9}$$

For a diagonal covariance matrix of noise, the net effect of changing the integration time of one band relative to another is to modify the covariance matrix as:

$$K^{-1} = \text{diag}(T_i/\sigma_i^2), \quad i=1,n \tag{10}$$

where, $$\sum_{i=1}^{n} T_i = T. \tag{11}$$

where T is the filter wheel period. Optimum integration times per band for a given set of templates and diagonal noise covariance can be found by maximizing SNR over the set of possible $T_i$, but subject to the constraint that:

$$\sum_{i=1}^{n} T_i = T. \tag{12}$$

The noise covariance K is applied to a SNR generation system 24 in order to generate the SNR for each individual template. Additionally, an input of the templates from the sensor model system 14 is applied to the SNR generation system 24. The SNR for the least squares in equation (4) is generated for each template in the system 24 as follows:

$$SNR_{jl} = \sqrt{k_{jj}\left(1 - \frac{k_{jl}^2}{k_{jj}k_{ll}}\right)} \tag{13}$$

where, $$k_{ji} = S_j^T K^{-1} S_1 \tag{14}$$

The SNR is applied to a composite SNR generation system 26 in order to generate a composite SNR for all m targets against one another, and a background. The composite SNR is determined with respect to a weighting function $W_{jl}$ for each template. The weighting function weights the more important targets over the less important targets in order to establish an appropriate integration time $T_i$ for each band. For example, a weighting of zero for all $W_{jl}$ when $l \neq 1$ would provide a composite SNR for individual targets versus background, only. The composite SNR is generated as follows:

$$SNR = \left( \frac{\sum_{j \neq l}^{m+2} w_{jl} SNR_{jl}^2}{\sum_{j \neq l} w_{jl}} \right)^{-1/2} \quad (15)$$

The composite SNR is the output of the system 10. However, in order for the system 10 to provide the optimal bands and integration times, it is usually necessary that the system 10 go through several iterations. Consequently, the composite SNR is applied as inputs to the n-band select system 12 and the integration time system 18. The n-band select system 12 uses the composite SNR to adjust the initial bands. Likewise, the composite SNR adjusts the integration time $T_i$ for each band in the integration time system 18. After a certain number of iterations, the composite SNR at the output of the composite SNR system 26 will provide the optimal band and integration times for the particular background and target spectra.

In one particular simulation, the initial bands of FIG. 1 were set as the input to the n-band select system 12, and each initial band was given the same integration time as an input to the integration time system 18. The initial SNR for these bands having the same integration times was 6.0. After running the system 10, the output bands generated were as shown as the final bands in FIG. 1. 71% of the total integration time was applied to the leftmost final band, and the remaining 29% of the integration time was for the rightmost band, with the integration time for the remaining bands as zero. The composite SNR output signal was 13.3.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A band analysis system for generating an optimal signal-to-noise ratio that isolates a target of interest from background clutter in a target detection system, said target detection system including a sensor sensing a scene, said band analysis system comprising:

a band select system, said band select system being responsive to a predetermined target spectrum representative of a target of interest and a predetermined background clutter spectrum representative of background clutter in the scene, said band select system generating a set of bands based on the target spectrum and the background clutter spectrum, wherein each band has a predetermined range of wavelengths;

an integration time system, said integration time system generating integration times for each band;

a sensor model system, said sensor model system being responsive to the set of bands from the band select system and the integration time system and generating a template for the target spectrum and the background clutter spectrum;

a noise generating system, said noise generating system being responsive to the templates from the sensor model system and the integration times for each band from the integration time system and generating a noise function for each band; and a signal-to-noise ratio generating system, said signal-to-noise ratio generating system being responsive to the noise function from the noise generating system and the templates from the sensor model system and generating a signal-to-noise ratio.

2. The system according to claim 1 further comprising a composite signal-to-noise ratio generating system, said composite signal-to-noise ratio generating system being responsive to the signal-to-noise ratio from the signal-to-noise ratio generating system and a weighting function and generating a composite signal-to-noise ratio.

3. The system according to claim 1 further comprising a noise covariance generating system, said noise covariance generating system being responsive to the noise function from the noise generating system and a correlation signal from a band/noise correlation system and generating a noise covariance signal, said noise covariance signal being applied to the signal-to-noise ratio generating system.

4. The system according to claim 3 wherein the correlation signal is a diagonal matrix.

5. The system according to claim 1 wherein the sensor model system generates the templates based on an aperture of the sensor, a detector footprint in the field of view of the sensor, and the distance the sensor is from the objects being sensed.

6. The system according to claim 1 wherein the band select system and the integration time system are responsive to the signal-to-noise ratio from the signal-to-noise ratio generating system in order to update the bands and their integration times.

7. The system according to claim 1 wherein the noise generating system generates the noise function based on filter wheel thermal noise, detector noise, read-out electronic noise, analog-to-digital converter noise and frequency noise.

8. A band analysis system for generating an optimal signal-to-noise ratio that isolates a target of interest from background clutter in a target detection system, said target detection system including a sensor sensing a scene, said band analysis system comprising:

band select system means for generating a set of bands based on a predetermined target spectrum representative of a target of interest and a predetermined background clutter spectrum representative of background clutter in the scene, wherein each band has a predetermined range of wavelengths;

sensor model system means for generating a template for the target spectrum and the background clutter spectrum, said sensor model means receiving the set of bands from the band select system means; and signal-to-noise ratio generating system means for generating a signal-to-noise ratio based on the templates from the sensor model system means.

9. The band analysis system according to claim 8 further comprising integration time system means for generating integration times for each band.

10. The band analysis system according to claim 9 further comprising noise generating system means for generating a noise function based on the templates from the sensor model system and integration times for each band from the integration time system means, said signal-to-noise ratio generating system means generating the signal-to-noise ratio based on the noise function from the noise generating system means and the templates from the sensor model system means.

11. The system according to claim 10 further comprising noise covariance generating system means for generating a noise covariance signal based on the noise function from the noise generating system means and a correlation signal from a band/noise correlation system, said noise covariance signal being applied to the signal-to-noise ratio generating system means.

12. The system according to claim 11 wherein the correlation signal is a the diagonal matrix.

13. The system according to claim 9 wherein the band select system means and the integration time system means receive the signal-to-noise ratio from the signal-to-noise ratio generating system means in order to update the bands and their integration times.

14. The system according to claim 8 further comprising composite signal-to-noise ratio generating means for generating composite signal-to-noise ratio based on the signal-to-noise ratio from the signal-to-noise ratio generating system and a weighting function.

15. The system according to claim 8 wherein the sensor model system means generates the templates based on an aperture of the sensor, the footprint of the field of view of the sensor, and the distance the sensor is from the objects being sensed.

16. A method for providing an optimal signal-to-noise ratio to separate a target of interest from background clutter in a target detection system, said target detection system including a sensor that senses a scene, said method comprising the steps of:

determining a target spectrum representative of a target of interest and a background clutter spectrum representative of background clutter in the scene;

generating a set of bands based on the target spectrum and the background clutter spectrum where each band has a predetermined range of wave lengths;

using a sensor model system responsive to the set of bands to generate a template for the target spectrum and the background spectrum;

generating a noise function indicative of vibrations of the sensor and electronic noise in the detection system, said noise function being based on an integration time and the template for each band; and generating a signal-to-noise ratio based on the noise function and the templates from the sensor model system.

17. The method according to claim 16 further comprising the step of applying a weighting function to the signal-to-noise ratio in order to generate a composite signal-to-noise ratio.

18. The method according to claim 16 further comprising the step of generating a noise covariance signal based on the noise function and a correlation signal, wherein the step of generating a signal-to-noise ratio includes generating the signal-to-noise ratio based on the noise covariance signal and the templates from the sensor model system.

19. The method according to claim 18 wherein the correlation signal is a diagonal matrix.

20. The method according to claim 16 wherein the templates are generated based on an aperture of the sensor, the footprint of the field of view of the sensor, and the distance the sensor is from the objects being sensed.

21. The method according to claim 16 wherein the step of generating a set of bands includes generating a set of bands based on the signal-to-noise ratio.

22. The method according to claim 16 wherein the step of determining a target spectrum and a background clutter spectrum includes determining multiple target spectra, a background clutter spectrum and a cloud spectrum, and wherein the step of generating a set of bands includes generating a set of bands based on the target spectra, the background clutter spectrum and the cloud spectrum.

23. The method according to claim 16 wherein the step of generating a noise function includes generating a noise function based on a filter wheel thermal noise, detector noise, read-out electronics noise, analog-to-digital converter noise and frequency noise.

24. The method according to claim 16 wherein the step of determining a target spectrum and a background clutter spectrum includes determining a target spectrum and a background clutter spectrum in the infrared frequency range.

* * * * *